United States Patent [19]
Reicks et al.

[11] Patent Number: 5,942,890
[45] Date of Patent: Aug. 24, 1999

[54] ROTATING SHAFT MONITORING DEVICE WITH A UNIVERSAL ATTACHING MECHANISM

[75] Inventors: Allen V. Reicks, Pella; Darrell R. Huffine, Knoxville; Steven J. Smith, New Sharon, all of Iowa

[73] Assignee: Precision, Inc., Pella, Iowa

[21] Appl. No.: 08/898,770

[22] Filed: Jul. 23, 1997

[51] Int. Cl.[6] .................................................. G01P 3/48
[52] U.S. Cl. .............. 324/173; 324/207.25; 324/207.22; 324/174
[58] Field of Search ........... 324/207.22, 207.13–207.15, 324/207.25, 166, 173, 174; 384/448, 535, 544, 624, 446; 74/63, 82, 84 R

[56] References Cited

U.S. PATENT DOCUMENTS

| | | | |
|---|---|---|---|
| 4,797,612 | 1/1989 | Nakanishi et al. | 324/173 |
| 5,010,290 | 4/1991 | Foster | 324/173 |
| 5,157,329 | 10/1992 | Brauer | 324/207.25 |
| 5,424,635 | 6/1995 | Robinson et al. | 324/174 |
| 5,550,467 | 8/1996 | Goossens | 324/173 |

OTHER PUBLICATIONS

4B Components Limited; "Rotech Encoder Rotating Shaft Monitor"; Jan. 1996.
Electro–Sensors, Inc.; "Speed Monitoring Systems and Controls".
Electro–Sensors, Inc.; "Shaft Speed Switch"; pp. 1–4.
Conveyor Components Company; "Controls for Bulk Material Handling".
Riede Systems, Inc.; "Digital Speed Switch".
Ramsey Technology Inc.; Ramsey—Accurate Conveyor Weighting of Bulk Materials—Series 20 Belt Scale System; Jan. 1996.
Reliance Electric Company; "Bearing Monitors"; 1996.

*Primary Examiner*—Jay Patidar
*Attorney, Agent, or Firm*—Henderson & Sturm

[57] ABSTRACT

The shaft monitoring device for monitoring the rotation of a shaft about a longitudinal axis is comprised of an encoder, a stationary housing, and a shaft-engaging member rotatably attached to the stationary housing. The encoder has a target and a proximity sensor located within the housing. The housing is mounted to a stationary object such as a block-type bearing supporting one end of the rotating shaft to be monitored. A first end of the shaft-engaging member is placed against the shaft. The first end firmly engages the rotating shaft, thereby allowing the shaft-engaging member to rotate in unison with the rotating shaft. As the shaft rotates, the target attached to a second end of the shaft-engaging member also rotates in unison. As the target passes over the end of the proximity sensor, the sensor reads the presence of the target and closes a switch. Each time the switch is closed, a pulse is generated. This pulse or signal is carried by a signal cable to a signal receiving device which can read the signals to determine the speed, direction of rotation, position, or rotation count of a shaft.

10 Claims, 5 Drawing Sheets

ROTATING SHAFT MONITORING DEVICE WITH A UNIVERSAL ATTACHING MECHANISM

CROSS-REFERENCE TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable.

BACKGROUND OF INVENTION

1. Field of Application

This invention relates generally to a device for monitoring a rotating shaft, and more particularly to a rotating shaft monitoring device to detect the speed, direction of rotation, position or revolution count of a shaft connected to a conveyor pulley or idler roller.

2. Description of Prior Art

There are a number of monitoring devices for detecting speed, direction, position or revolution count of rotating shafts. Unfortunately, the presently available monitoring devices are high in cost and require replacement or modification of existing equipment before the monitoring devices can be installed on the rotating shaft. Although at least one manufacturer has devised a way to minimize the amount of modification required to install its monitoring devices onto a shaft, its monitoring devices require special couplings between the existing shaft and the monitoring device. Often these couplings do not create a strong enough joint between the shaft and monitoring device in order to withstand impact to the monitoring device. Thus the monitoring device can be knocked off or bumped resulting in inaccurate readings of the rotating shaft or no readings at all.

Therefore a monitoring device is needed that is compact, easy to install, and that does not require the replacement or modification of existing equipment, or the need for a special coupling in order to connect the rotating shaft to the monitoring device. Additionally, the interface between the rotating shaft and the monitoring device should be strong and able to withstand impact while still maintaining accurate readings.

BRIEF SUMMARY OF THE INVENTION

In a preferred embodiment, the shaft monitoring device for monitoring the rotation of a shaft about a longitudinal axis is comprised of an encoder, a stationary housing, and a shaft-engaging member rotatably attached to the stationary housing. The encoder is comprised of a target and a proximity sensor located within the housing. The housing is mounted to a stationary object such as a block-type bearing supporting one end of the rotating shaft to be monitored. A first end of the shaft-engaging member is placed against the shaft. The first end firmly engages the rotating shaft, thereby allowing the shaft-engaging member to rotate in unison with the rotating shaft. As the shaft rotates, the target attached to a second end of the shaft-engaging member also rotates in unison. As the target passes over the end of the proximity sensor, the sensor reads the presence of the target and closes a switch. Each time the switch is closed, a pulse is generated. This pulse or signal is carried by a signal cable to a signal receiving device which can read the signals to determine the speed, direction, rotation count, direction of rotation, or position of the shaft.

It is therefore an object of this invention to provide a novel and improved rotating shaft monitoring device to detect speed, direction, position or revolution count of rotating shafts which can be installed on existing equipment without requiring the replacement, or modification of existing equipment.

It is another object of this invention to provide a monitoring device which can be attached to a rotating shaft without requiring a special coupling device to connect the rotating shaft to the monitoring device and also to provide an interface between the rotating shaft and monitoring device that can withstand impact to the device and still maintain accurate readings of the rotating shaft.

It is a further object of this invention to provide a monitoring device that is compact, easy to install, and relatively inexpensive.

Other objects, advantages, and novel features of the present invention will become apparent from the following detailed description of the invention when considered in conjunction with the accompanying drawings.

DETAILED DESCRIPTION OF THE INVENTION

Figure 1:
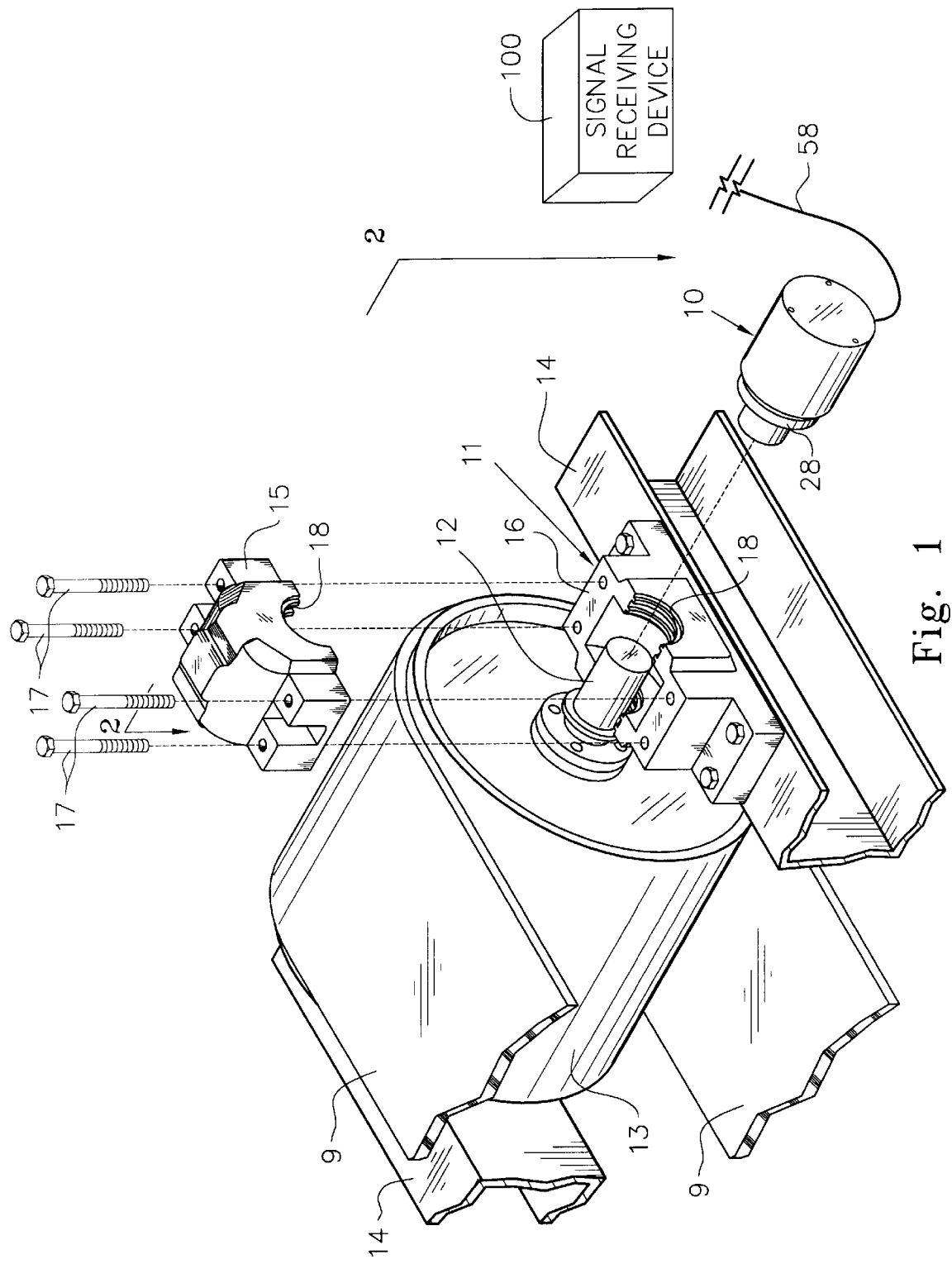
FIG. 1 is an exploded perspective view of a monitoring device of the present invention being attached to a bearing-type mounting supporting one end of a shaft of a conveyor pulley.

Referring now to the drawings wherein like reference numerals designate identical or corresponding parts throughout the several views, FIG. 1 shows an exploded view of a typical application of the rotating shaft monitoring device (10) of the present invention being mounted onto a bearing (11) which supports one end of a shaft (12) of a typical conveyor pulley (13) which supports belt (9). The bearing (11) is mounted to a frame member (14) used to support the conveyor pulley (13).

Figure 2:
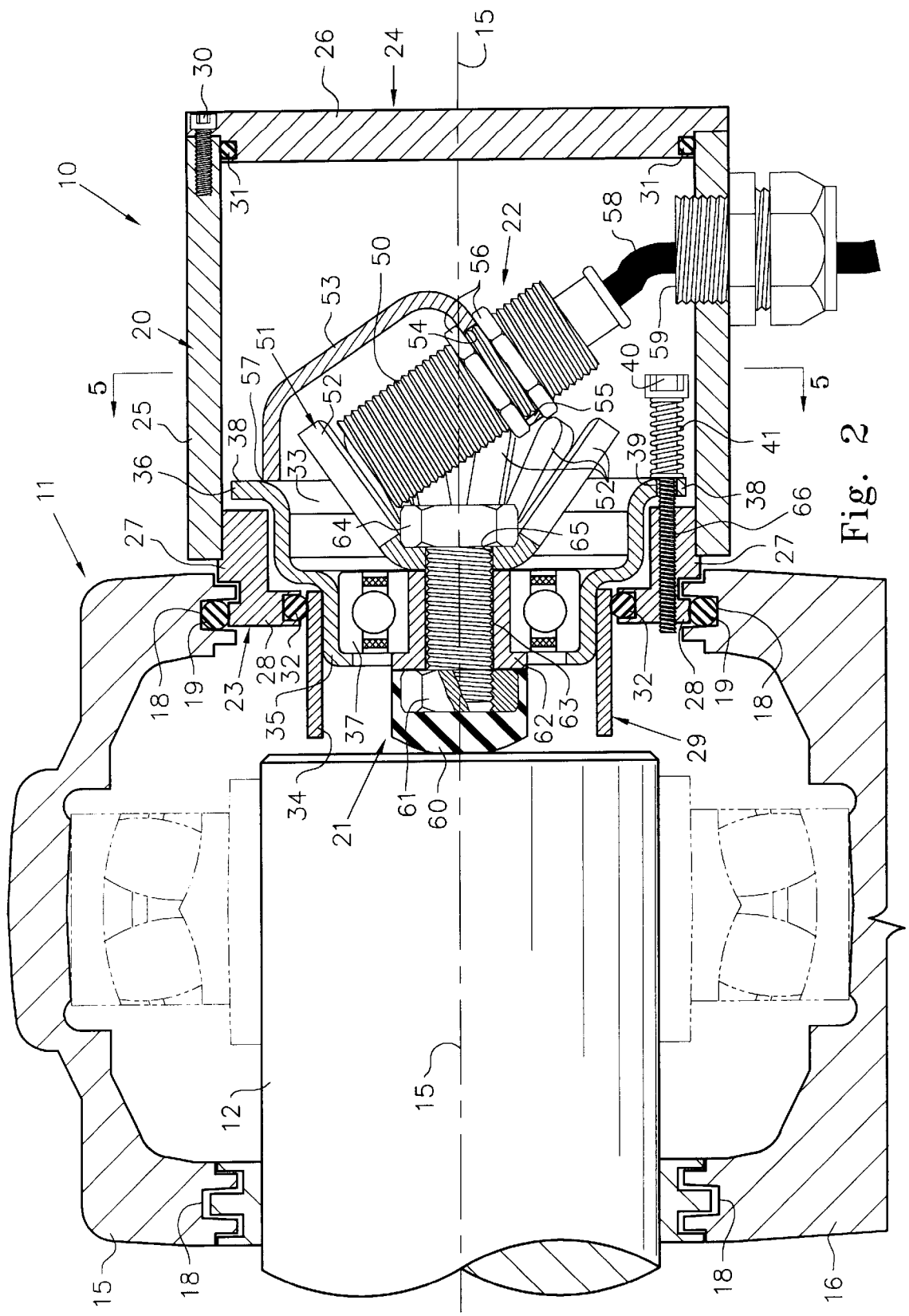
FIG. 2 is a cross sectional view taken along line 2—2 of FIG. 1 showing the monitoring device attached to the block-type bearing and illustrating a resilient interface of the shaft-engaging member with the end of the rotating shaft.

Referring to FIG. 1 in conjunction with the cross-sectional view of FIG. 2, taken along lines 2—2 of FIG. 1, the monitoring device (10) is shown mounted to the bearing (11). The bearing (11) is comprised of two halves, a top half (15) and a bottom half (16). The two halves (15 and 16) being held together by threaded bolts (17). When preparing to mount the monitoring device (10) to the bearing (11), the bolts (17) are unthreaded and the top half(15) of the bearing (11) is removed revealing a female, channel-shaped interior periphery (18) formed in the edges of each half(15 and 16) of the bearing (11). The female channel-shaped interior periphery (18) receives the male annular flange (28) of the monitoring device (10). An O-ring (19) is placed between the mating parts (18 and 28) of the bearing (11) and the monitoring device (10) to reduce vibration and noise which would otherwise result from steel-to-steel contact as well as to prevent dust and debris from entering the bearing housing. The top half (15) of the bearing (11) is then replaced over the lower half (16) and the bolts (17) are threaded into position securing the monitoring device (10) to the bearing (11) within its channel shaped interior periphery (18).

Referring now to FIG. 2, the rotating shaft monitoring device (10) is comprised of a stationary housing (20), a shaft-engaging member (21), and an encoder (22). The stationary housing (20) has an inside face (23) and an outside face (24). For the purposes of this specification, a reference to an "outside" or "outward" face or side should be understood as referring to be away from the shaft (12), and a reference to an "inside" or "inward" face or side should be understood as referring to be toward the shaft (12). In the preferred embodiment, the stationary housing (20) is comprised of a cylindrical shell (25), a circular end plate (26), a mounting member (27) having an annular mounting flange (28), and an adjustable intermediate member (29) all made of gauge steel plate. Although the following specification describes the housing (20) and the elements of which it is comprised as being cylindrical or annular in shape, it should be appreciated that the shape of the stationary housing (20) and the elements of which it is comprised is not limited to a cylindrical or annular shape, but could be rectangular or any other shape.

The end plate (26) is removably attached to the outside face of the shell (25) by countersunk screws (30) which threadably engage the shell (25). The end plate (26) includes a second O-ring (31) around its exterior perimeter, to seal out dust and debris which may otherwise enter the housing (20) between the abutting surfaces of the exterior perimeter of the end plate (26) and the shell (25).

The mounting member (27) is fixedly attached to the inward side of the shell (25). Disposed within the interior periphery of the mounting member (27) is the adjustable intermediate member (29). The mounting member (27) is separated from the adjustable intermediate member (29) by a third O-ring (32) to prevent dust and debris from entering the housing (20). The adjustable intermediate member (29) is comprised of a bell-shaped hub (33) and a cylinder (34). The bell-shaped hub (33) having a cylindrical inward portion (35) and an annular flanged outward portion (36). The cylindrical inward portion (35) of the bell-shaped hub (33) contains an annular bearing (37). The cylindrical inward portion (35) is secured by a frictional fit or other means, such as welding, within the outwardly projecting end of the cylinder (34), thus the bell-shaped hub (33) and cylinder (34) act as a single unit. The outward portion of the hub (33) includes an annular flange (38) having openings (39) therein for receiving adjusting bolts (40). The adjusting bolts (40) are threadably engaged into a threaded opening (66) in the mounting member (27). Springs (41) are located between the head of the adjusting bolts (40) and the annular flange (38) thus biasing the intermediate members (29) against the heads of the adjusting bolts (40). The purpose of the adjusting bolts (40) and the spring bias of the intermediate members (29) will be discussed in detail below.

Figure 5:
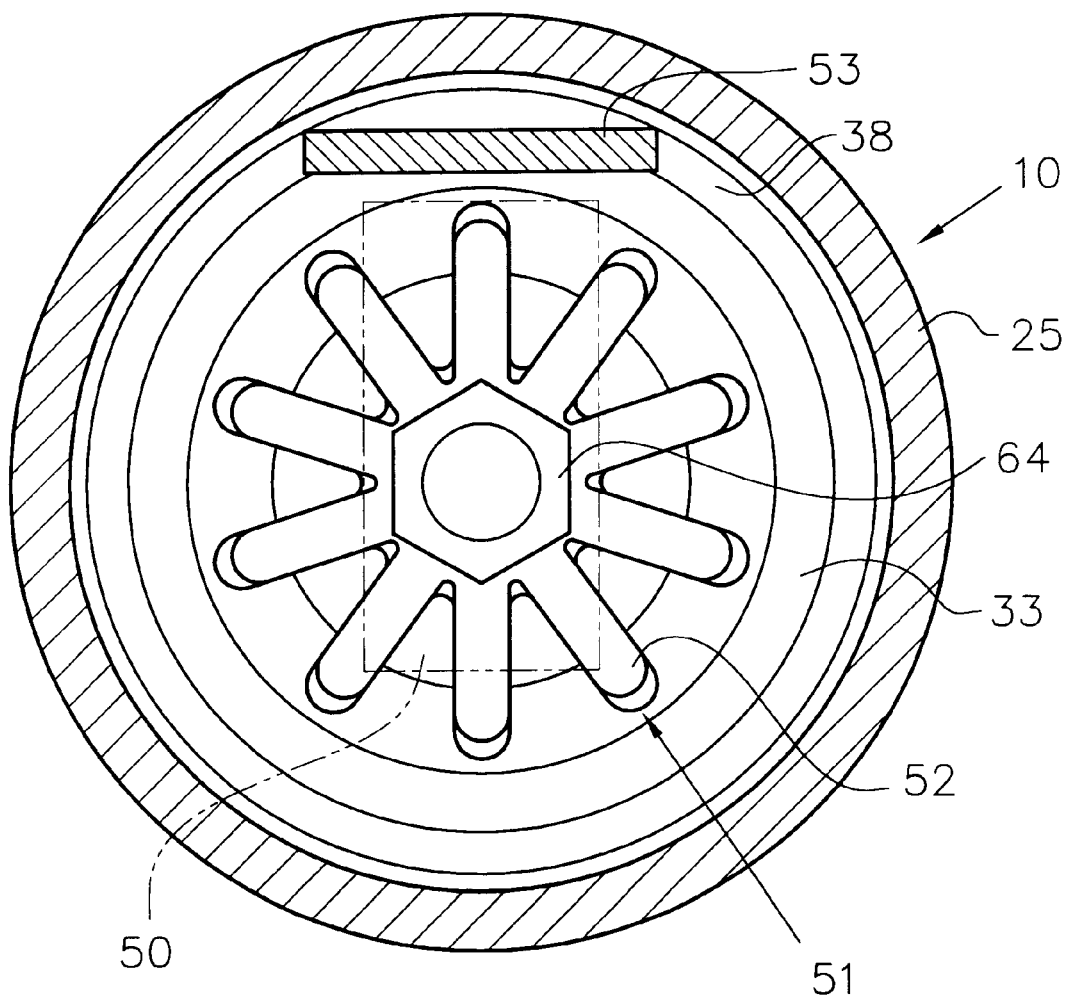
FIG. 5 is a cross-sectional view taken along lines 5—5 of FIGS. 2—4 showing the target disposed within the housing.

The encoder (22) is comprised of a proximity sensor (50) and a target (51). The preferred proximity sensor (50) is a pre-wired inductive proximity sensor TL-X5-Y1, M18 manufactured by OMRON having a threaded exterior surface. The pre-wired sensor (50) includes a signal cable (58) securely attached at one end. Also in the preferred embodiment, the target (51) is comprised of a number of individual radially disposed target elements (52) bent in an outward direction such that they pass near the proximity sensor (50) as they rotate (to be discussed later). The radially disposed target elements (52) of the target (51) are best illustrated in FIG. 5.

The proximity sensor (50) is securely attached to a bracket (53) by passing through an opening (54) at the one end (55) of the bracket (53). Two nuts (56) threadably engaging the exterior of the proximity sensor (50) on each side of the bracket (53) secure the proximity sensor (50) within the opening (54) of the bracket (53). The other end (57) of the bracket (53) is fixedly attached to the annular flange (38) of the bell-shaped hub (33) of the intermediate member (29).

The shaft-engaging member (21) is comprised of a nut (61) bonded within a resilient member (60) (for example a rubber-type material) at its inward end and a flanged bushing (62) having a centrally located opening (63) therein. The target (51) is attached to the outward end of the bushing (62) of the shaft-engaging member (21) by a threaded connector (64) passing through a centrally located opening (65) in the target (51). It should be understood that the threaded connector (64) longitudinally joins together the resilient member (60), the bushing (62), and the target (51). It should also be understood that the resilient member (60), bushing (62), and target (51) are longitudinally fixed by the connector (64) to the annular bearing (37) of the intermediate member (21), but are free to rotate as a single unit about the longitudinal axis (15) within the annular bearing (37).

It should be appreciated that after the monitoring device (10) is mounted to the bearing (11), the resilient member (60) must be in contact with the end of the shaft (12). To accomplish this, the adjusting bolt (40) is rotated clockwise causing the bolt (40) to move inwardly within the threaded opening (66). As the adjusting bolt (40) is threaded inwardly, the bias of the spring (41) forces the intermediate member (29) inwardly, thereby causing the shaft-engaging member (21) to also move inwardly until the resilient member (60) is in sufficient contact with the shaft (12). The frictional resistance between the shaft (12) and the resilient member (60) may be increased or decreased by rotating the adjusting bolt (40) clockwise or counterclockwise respectively. It should also be appreciated that when the intermediate member (29) is moved inwardly, the target (51) and the proximity sensor (50) move along with it.

In operation, as the shaft (12) rotates, the frictional resistance between the end of the shaft (12) and the resilient member (60) will cause the shaft engaging member (21) to rotate within the bearing (37) about a longitudinal axis (15). The target (51) attached to the outward end of the shaft-engaging member (21) by connector (64) will also rotate in unison. As each individual radial target (52) of the target (51) passes over the end of the proximity sensor (50), the sensor reads the presence of the target and closes a switch. Each time the switch is closed, a pulse is generated. This pulse or signal is carried by the signal cable (58) through an opening (59) in the shell (25) to a signal receiving device (100) (see FIG. 1). The signal receiving device (100) may be a speed monitoring device, a revolution count monitor, a direction monitor, a position monitor, or a programmable logic controller (PLC).

The speed monitoring device operates by reading the time between the pulses to determine the speed of the rotating shaft. Once the speed of the shaft is calculated, a number of functions may be performed. For example, if the time between pulses is too fast or too slow, as compared to a predetermined rate of speed, a speed monitoring device may be used to increase or decrease the speed of the conveyor belt and pulley by sending a signal to the shaft driving means to increase or decrease the revolutions per minute (rpm) in order to maintain the desired speed. Another function of the signal receiving device (100) may be to shut down the conveyor system if the delay between the pulses indicates that the shaft has stopped rotating due to a break down or slippage.

It is also to be understood that this system could be used for multiple conveyor systems. In situations where the materials go from one conveyor to other conveyors it may be desirable for the entire conveyor system to stop if a downstream conveyor were to stop. In such a situation, when the receiving device (100) determines that the shaft is not rotating, it would send a signal to the PLC. The PLC would be programmed to stop the upstream conveyors so that the other conveyors do not continue to dump materials onto the stopped downstream conveyor. These are but a few of many examples of the use of the present invention.

Figure 3:
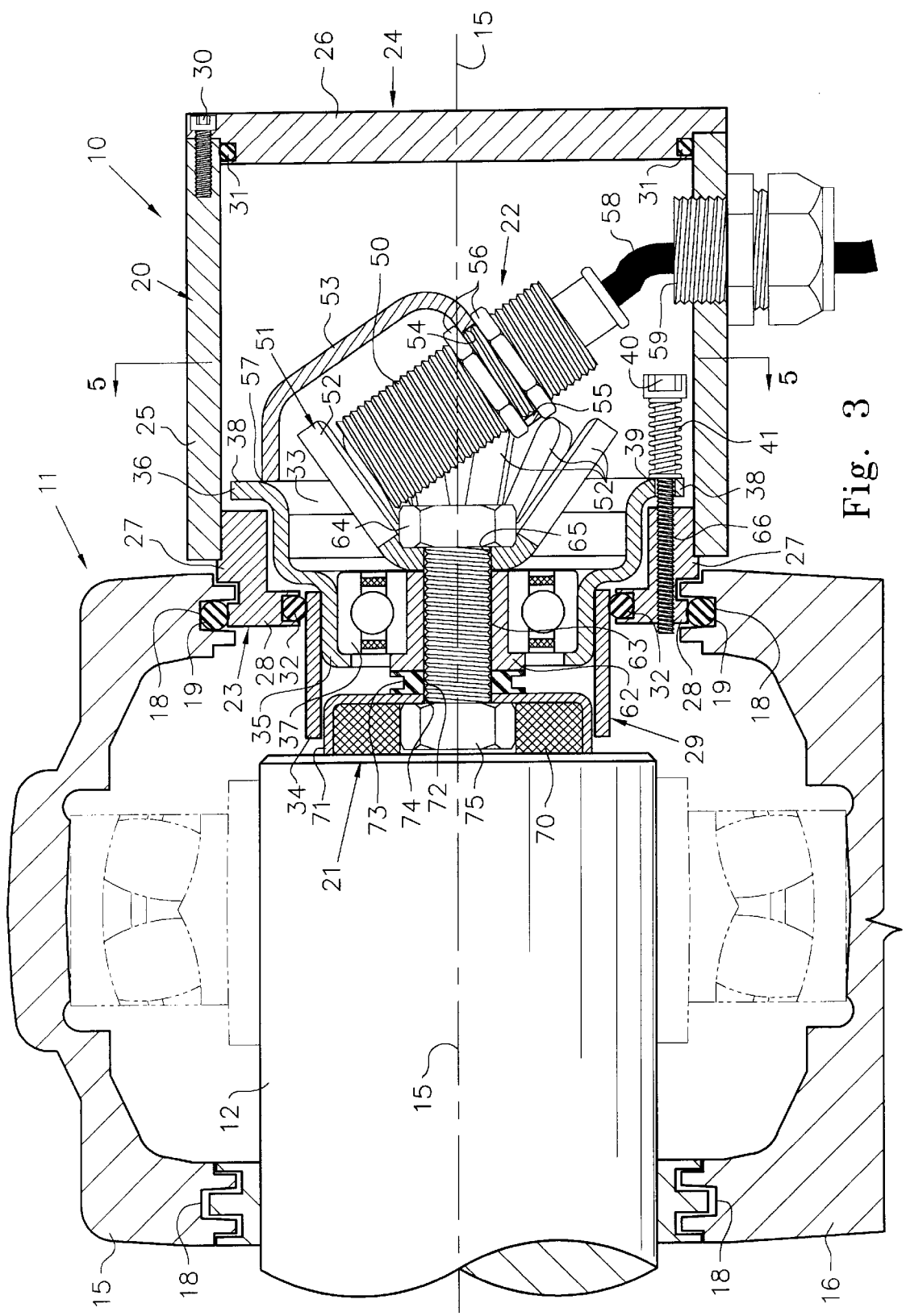
FIG. 3 is a view of an alternate embodiment which is substantially similar to that shown in FIG. 2 except that FIG. 3 is illustrating a magnetic interface of the shaft-engaging member with the end of the rotating shaft.

An alternative embodiment to that just described and illustrated in FIG. 2 is shown in FIG. 3. Instead of relying on a frictional connection between a resilient-type element and the rotating shaft (12), a magnetic connection may be used. By replacing the resilient member (60) threadably engaging the connector (64) (see FIG. 2), with an annular magnet (70), a more durable and stronger connection may be obtained. In the alternative embodiment, an annular magnet (70) is disposed within a cup-shaped housing (71) preferably made of steel. The cup-shaped housing (71) has a centrally located opening (72) for receiving the threaded connector (64). Separating the cup-shaped housing (71) from the bushing (62) is a non-ferrous elastomeric washer (73) also having a centrally located opening (74) therein for receiving the threaded connector (64). Using an elastomeric washer (73) allows angular deflection. Disposed within the interior periphery of the annular magnet (70) is a nut (75) for threadably engaging the threaded connector (64), thereby longitudinally joining the annular magnet (70), the cup-shaped housing (71), and the non-ferrous washer (73) to the bushing (62) and to the target (51). As above, it should be understood that although the elements (70, 71, 62 and 51) are fixed longitudinally, they are still free to rotate as a single unit about the longitudinal axis (15) within the annular bearing (37).

The operation of the alternative embodiment just described is similar to that described for the embodiment using the rubber-type member (60). After the monitoring device (10) is mounted to the bearing (11), the annular magnetic (70) must be in contact with the end of the shaft (12). To accomplish this, the adjusting bolt (40) is rotated clockwise causing the bolt (40) to move inwardly within the threaded opening (66) in the mounting member (27). As the adjusting bolt (40) is threaded inwardly, the bias of the spring (41) forces the intermediate member (29) inwardly, thereby causing theshaft-engaging member (21) to move inwardly until the annular magnet (70) is in sufficient contact with the shaft (12). The annular magnet (70) may be removed from the shaft (12) by rotating the adjusting bolt (40) counterclockwise. It should be appreciated that when the intermediate member (29) is moved inwardly, the target (51) and the proximity sensor (50) move along with it. The spring and bolt adjustment structure is optional on the magnetic version shown in FIG. 3.

In operation, as the shaft (12) rotates, the magnetic force between the end of the shaft (12) and the annular magnet (70) will cause the shaft engaging member (21) to rotate within the bearing (37) about a longitudinal axis (15). The target (51) attached to the outward end of the shaft-engaging member (21) by connector (64) will rotate in unison. As each individual radial target (52) of the target (51) passes over the end of the proximity sensor (50), the sensor reads the presence of the target and closes a switch. Each time the switch is closed, a pulse is generated. This pulse or signal is carried by the signal cable (58) through an opening (59) in the shell (25) to a signal receiving device (100). The functions which may be performed by the signal receiving device are the same as those discussed for the first embodiment of the present invention.

Figure 4:
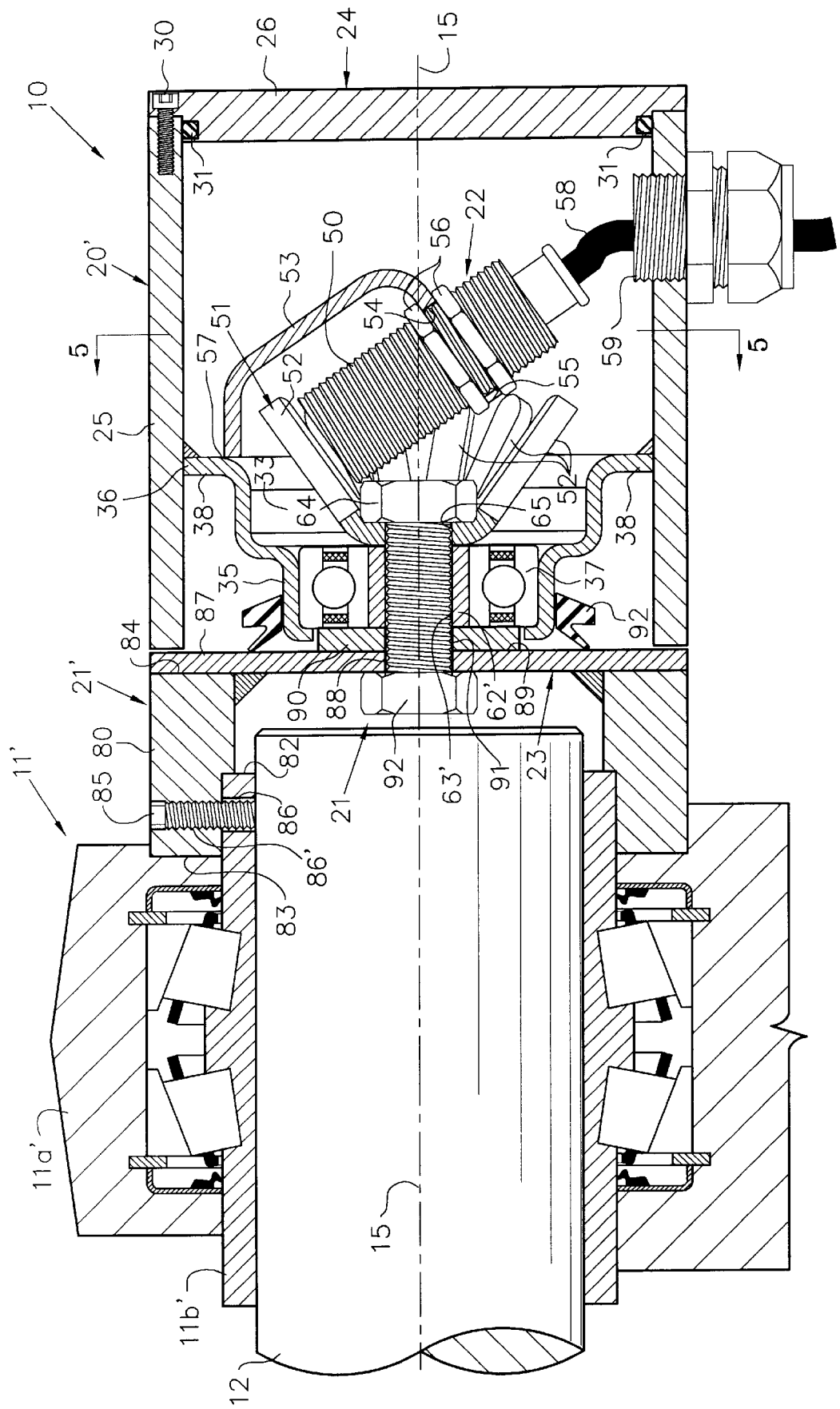
FIG. 4 is a view of another alternate embodiment which is illustrating the shaft-engaging member attached with a set screw to the barrel of a barrel-type bearing.

A third embodiment of the present invention is shown in FIG. 4. This embodiment illustrates the mounting of the monitoring device (10) to a different type of bearing (11') having a barrel (11b') longitudinally disposed within the bearing housing (11a'). Rather than mounting the monitoring device (10) to the interior periphery of the bearing housing (11a'), the monitoring device is mounted to the exterior periphery of the barrel (11b'). In the embodiment illustrated in FIG. 4, the rotating shaft monitoring device (10) is shown in cross-section. The rotating shaft monitoring device (10) is comprised of a stationary housing (20'), a shaft-engaging member (21'), and an encoder (22). The stationary housing (20') has an inside face (23) and an outside face (24). The stationary housing (20') is comprised of a cylindrical shell (25), and a circular end plate (26). Note, in this embodiment, the stationary housing (20') does not include the flanged mounting member (27) used in the previous embodiments.

Similar to the previous embodiments (shown in FIGS. 2 and 3), the end plate (26) is removably attached to the outside face of the shell (25) by countersunk screws (30) which threadably engage the shell (25). The end plate (26) includes an O-ring (31) around its exterior perimeter, to seal out dust and debris which may otherwise enter the housing (20') between the abutting surfaces of the exterior perimeter of the end plate (26) and the shell (25).

Also similar to the previous embodiments, a bell-shaped hub member (33) is contained within the housing (20'). The bell-shaped hub (33) having a cylindrical inward portion (35) and an annular flanged outward portion (36). The cylindrical inward portion (35) of the bell-shaped hub (33) contains an annular bearing (37). The outward portion of the bell-shaped hub (33) includes an annular flange (38) fixedly attached to the interior periphery of the shell (25).

The shaft-engaging member (21') shown in FIG. 4 is comprised of a first annular member (80) with at least a portion of its interior periphery complementary to the exterior periphery of the outwardly projecting end (82) of the barrel (11b') of the bearing (11'). Toward the inward edge (83) of the annular member (80) is located a plurality of equally spaced countersunk set screws (85) which threadably engage similarly spaced threaded openings (86') in annular member (80). Openings (86) in the outwardly projecting end (82) of the barrel (11b') receive set screws (85) so that set screws (85) can contact shaft (12). The ends of the screws (85) bear on the exterior periphery of the shaft (12) thereby fixing the shaft engaging member (21') to the barrel (1b') and shaft (12) allowing them to rotate in unison.

Fixedly attached to the outside face (84) of the annular member (80) is a cap plate (87) having a centrally located hole (88) therein for receiving a threaded connector (64). An annular plate (90) is attached to the outside face (89) of the cap plate (87). The annular plate (90) has a centrally located hole (91) for receiving a bushing (62'). The bushing is disposed within an annular bearing (37). The outside face (91) of the annular plate (90) abuts against the inside face of the annular bearing (37). A sleeve (92) abutting the outside face of the cap plate (87) and fixed to the cylindrical portion (35) of the bell-shaped hub (33) acts as a seal to prevent dust and debris from entering the housing (20').

The encoder (22) is the same as that disclosed above for the previous embodiments. The encoder (22) is comprised of a proximity sensor (50) and a target (51). The preferred proximity sensor (50) is a pre-wired inductive proximity sensor TL-X5-Y1, M18 manufactured by OMRON having a threaded exterior surface. The pre-wired sensor (50) includes a signal cable (58) securely attached at one end. The target (51) is comprised of a number of individual radially disposed target elements (52) (see FIG. 5) bent in an outward direction such that they pass over the proximity sensor (50) as they rotate (to be discussed later).

The proximity sensor (50) is securely attached to a bracket (53) by passing through an opening (54) at the one end (55) of the bracket (53). Two nuts (56) threadably engaging the exterior of the proximity sensor (50) on each side of the bracket (53) secure the proximity sensor (50) within the opening (54) of the bracket (53). The other end (57) of the bracket (53) is fixedly attached to the annular flange (38) of the hub (33).

The target (51) is attached to the outward end of the shaft-engaging member (21) by a threaded connector (64) passing through a centrally located opening (65) in the target (51). The threaded connector (64) also passes through opening (63') of the bushing (62') and opening (88) of the cap plate (87). A nut (92), threadably secured onto the inward end of the threaded connector (64) longitudinally joins together the target (51), the bushing (62'), and the cap plate (87) thereby allowing the parts (51, 62' and 87) to rotate as a single unit about the longitudinal axis (15) within the annular bearing (37).

In operation, as the shaft (12) rotates, the barrel (11b') and the shaft-engaging member (21') rotate in unison about the longitudinal axis (15). The rotation of theshaft-engaging member (21') is transferred to the target (51) attached to the outward end of the shaft-engaging member (21) by connector (64). As each individual radial target (52) of the target (51) passes over the end of the proximity sensor (50), the sensor reads the presence of the target and closes a switch. Each time the switch is closed, a pulse is generated. This pulse or signal is carried by the signal cable (58) through an opening (59) in the shell (25) to a signal receiving device (100). The functions which may be performed by the signal receiving device are the same as those discussed for the first embodiment of the present invention.

It should be understood that the present invention may include alternative embodiments to the third embodiment just described and illustrated in FIG. 4. For example, rather than attaching the shaft-engaging member (21') to the exterior periphery of the barrel (11b') of a barrel-type bearing (11') with set screws, the annular member (80) may be clamped directly to the shaft (12) by set screws (85) or other means. Alternatively, the annular member (80) may be a magnetic ring which directly attaches to the shaft (12). In still another alternative embodiment, the annular member (80) may be a magnetic ring which attaches to the barrel (11b').

It will be appreciated that the present invention accomplishes the objects stated above. Obviously many modifications and variations of the present invention are possible in light of the above teachings. It is therefore to be understood that, within the scope of the appended claims, the invention may be practiced otherwise than as specifically described.

What is claimed is:

1. A rotating shaft monitoring device for monitoring rotation of a shaft about a longitudinal axis, said shaft having a flat end portion, comprising:

a stationary housing, an encoder operatively disposed within said stationary housing, a shaft-engaging member rotatably attached by bearings to and disposed within said stationary housing and having a first and second end, and means for attaching said shaft-engaging member to said shaft without modification of said shaft, said first end of said shaft-engaging member being engaged in frictional driving contact with said flat portion of said shaft, thereby causing said shaft-engaging member to rotate in unison with said shaft about the longitudinal axis of said shaft.

2. The rotating shaft monitoring device of claim 1 wherein said encoder is disposed inside said stationary housing, said housing being positioned near one end of said shaft in such proximity that said first end of said shaft-engaging member is engaged with said shaft thereby allowing said shaft-engaging member to rotate in unison with said shaft about the longitudinal axis of said shaft.

3. The rotating shaft monitoring device of claim 1 wherein said encoder comprises a target and a proximity sensor for sensing the target as it rotates past the proximity sensor, said target being attached to said second end of said shaft-engaging member.

4. The rotating shaft monitoring device of claim 3 including a signal cable connected to said proximity sensor for carrying a signal from said proximity sensor to a signal receiving device.

5. The rotating shaft monitoring device of claim 1 wherein said attaching means includes a resilient portion on said first end of said shaft-engaging member.

6. The rotating shaft monitoring device of claim 5 wherein said shaft-engaging member is laterally adjustable such that said first end of shaft-engaging member is disposed in firm contact with the end of said shaft thereby allowing the shaft-engaging member to rotate in unison with said shaft about the longitudinal axis of said shaft.

7. A rotating shaft monitoring device for monitoring rotation of a shaft about a longitudinal axis, said shaft having a flat end portion, comprising:

a stationary housing, an encoder operatively disposed within said stationary housing, a shaft-engaging member rotatably attached by bearings to and disposed within said stationary housing and having a first and second end, and magnetic means for attaching said shaft-engaging member to said shaft without modification of said shaft.

8. The rotating shaft monitoring device of claim 7 wherein said attaching means includes a magnetic portion on said first ends of said shaft-engaging member.

9. The rotating shaft monitoring device of claim 7 wherein saidshaft-engaging member is laterally adjustable such that said first end of said shaft-engaging member is disposed in firm contact with the end of said shaft thereby allowing the shaft-engaging member to rotate in unison with said shaft about the longitudinal axis of said shaft.

10. The rotating shaft monitoring device of claim 7 wherein said encoder is disposed inside said stationary housing, said housing being positioned near one end of said shaft in such proximity that said first end of said shaft-engaging member is engaged with said flat portion of said shaft, thereby allowing said shaft-engaging member to rotate in unison with said shaft about the longitudinal axis of said shaft.

* * * * *